United States Patent [19]

Fleischer

[11] 4,344,649
[45] Aug. 17, 1982

[54] FOLDING BABY CARRIERS

[76] Inventor: Henry Fleischer, 18 Notch Park Rd., Little Falls, N.J. 07424

[21] Appl. No.: 73,745

[22] Filed: Sep. 10, 1979

[51] Int. Cl.³ .......................... A47C 4/00; A47C 1/02
[52] U.S. Cl. ...................................... 297/30; 297/68; 297/75; 297/355
[58] Field of Search ........................ 297/68, 75, 90, 78, 297/81, 30, 343, 342, 341, 318, 355, 317, 42, 377, 464

[56] References Cited

U.S. PATENT DOCUMENTS

| | | | |
|---|---|---|---|
| 240,991 | 5/1881 | Fuller | 297/30 X |
| 262,311 | 8/1882 | Ortlepp | 297/30 X |
| 523,903 | 7/1894 | McPhee et al. | 297/27 |
| 683,907 | 10/1901 | Brown | 297/368 X |
| 770,852 | 9/1904 | Grover | 297/38 |
| 1,122,833 | 12/1914 | Withrow | 297/343 X |
| 1,414,897 | 5/1922 | Reilly | 297/31 |
| 1,802,606 | 4/1931 | Krause | 297/343 |
| 1,802,607 | 4/1931 | Krause | 297/343 |
| 2,493,646 | 1/1950 | Schmidt | 297/22 |
| 2,530,592 | 11/1950 | Aries | 297/343 X |
| 2,598,985 | 6/1952 | Everest et al. | 297/433 |
| 3,269,768 | 8/1966 | Kinney | 297/68 |
| 3,345,105 | 10/1967 | Levy et al. | 297/30 X |
| 3,414,321 | 12/1968 | Beck | 297/30 |
| 3,649,074 | 3/1972 | McDonald et al. | 297/377 |
| 4,076,303 | 2/1978 | Korenblit | 297/30 |
| 4,084,849 | 4/1978 | Ishida | 297/377 |
| 4,265,481 | 5/1981 | Fleicher | 297/30 |

FOREIGN PATENT DOCUMENTS

| | | | |
|---|---|---|---|
| 9105 | 9/1979 | Austria | 297/81 |
| 329834 | 5/1930 | United Kingdom | 297/343 |

*Primary Examiner*—James T. McCall

[57] ABSTRACT

Baby carriers are provided which may be deployed in a reclining position as a bed, in an upright position as a seat or chair, or semi-reclining or semi-upright position therebetween and which may be employed in conjunction with collapsible frames to provide strollers, carriages, high chairs, youth chairs, bathinettes and the like. One embodiment of the collapsible carrier involves three-way carriers which is easily converted from seat or chair into a reclining attitude to function as a bed. The three-way carriers include a head-back rest portion, body or seat portion and leg rest portion. Movement and positioning of one of the head-back rest portion and leg rest portion will cause corresponding opposite movement and positioning in the other.

The baby carriers of the invention may also be employed without the above-mentioned support frames, as a self-sustaining unit and as such may function as a car bed, infant seat, youth chair and the like.

27 Claims, 16 Drawing Figures

U.S. Patent Aug. 17, 1982 Sheet 6 of 8 4,344,649
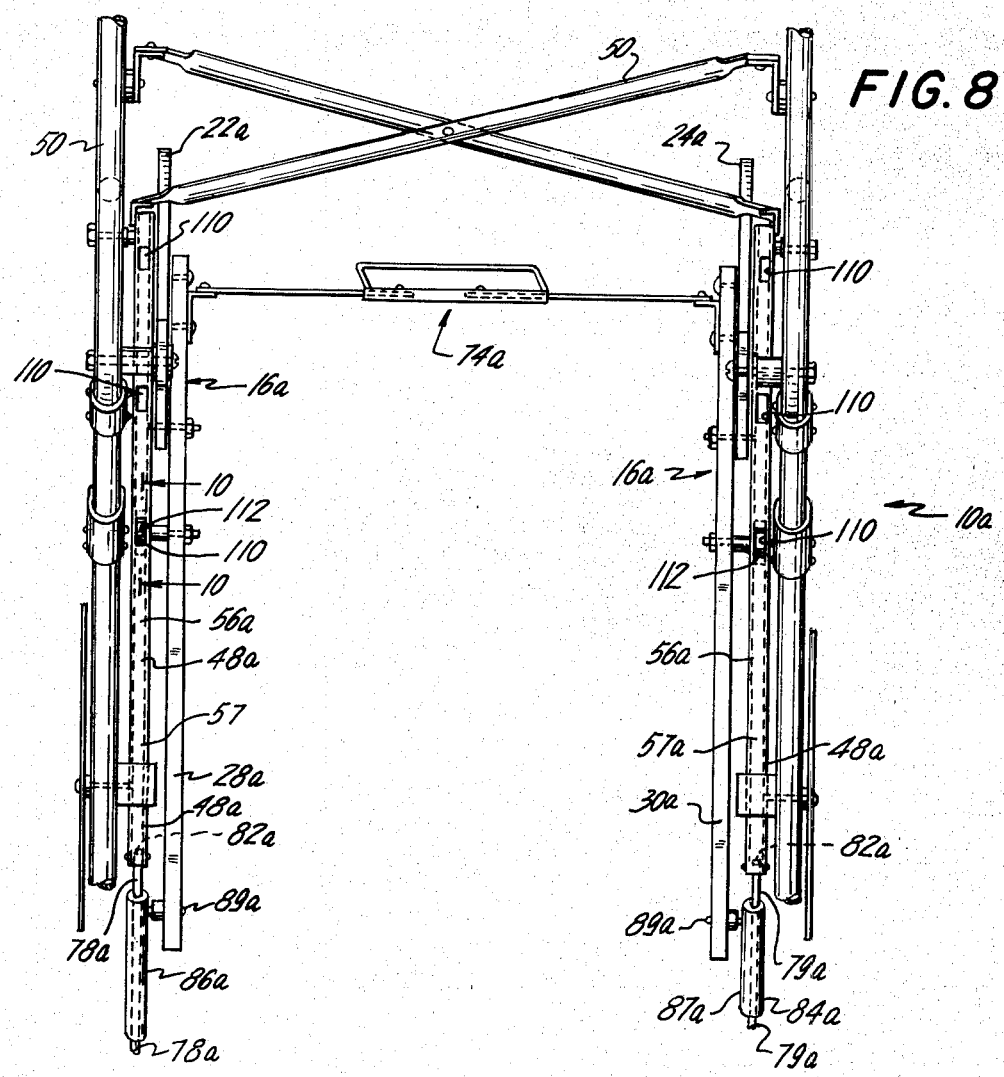
FIG. 8
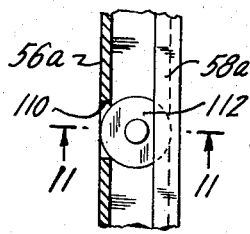
FIG. 10
FIG. 11

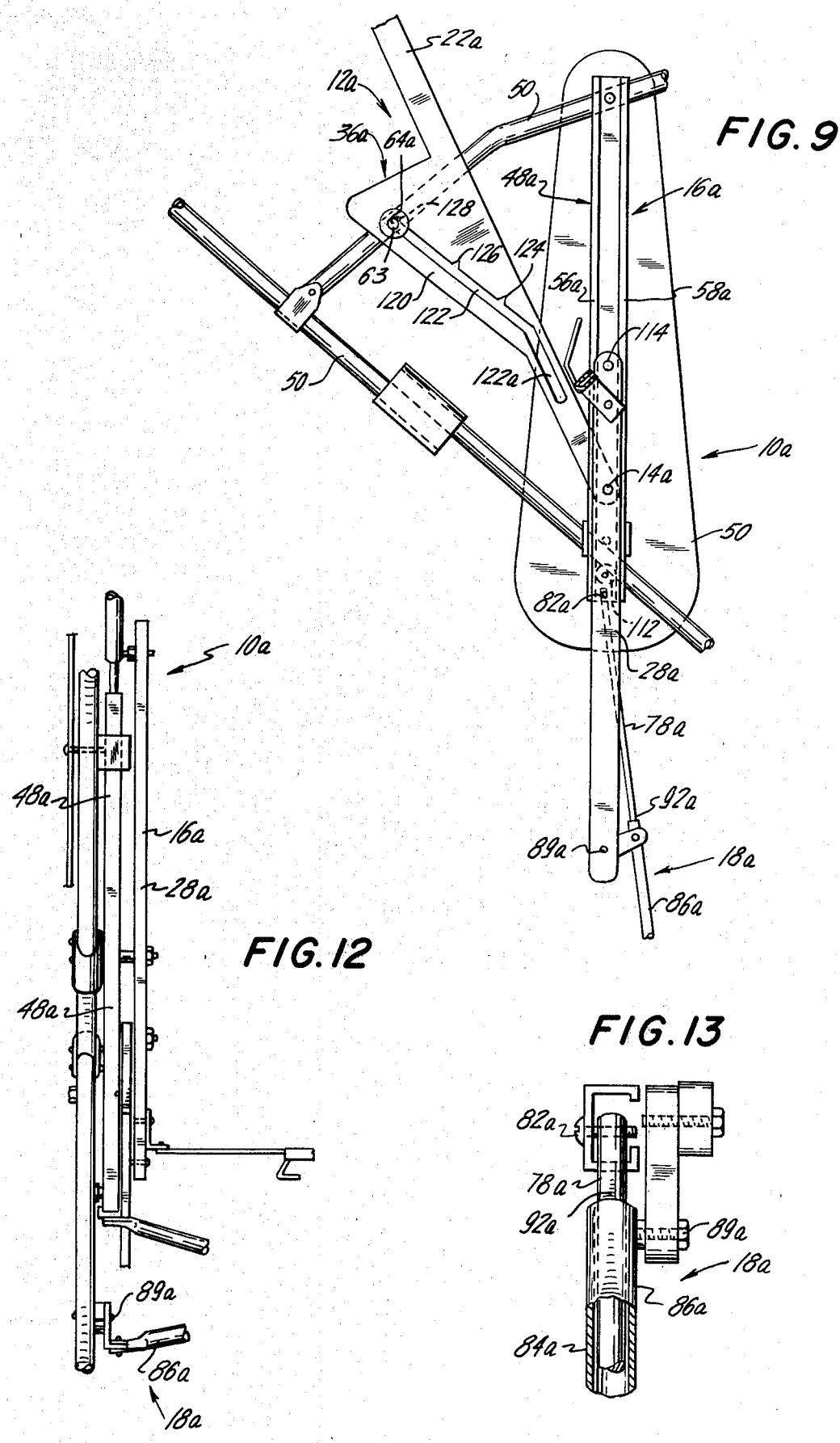

FIG. 14
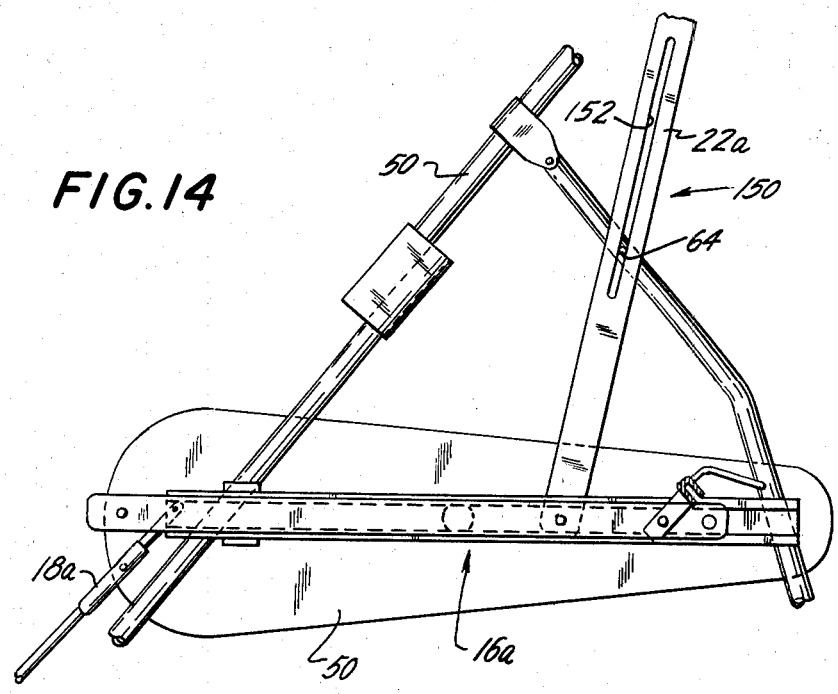
FIG. 16
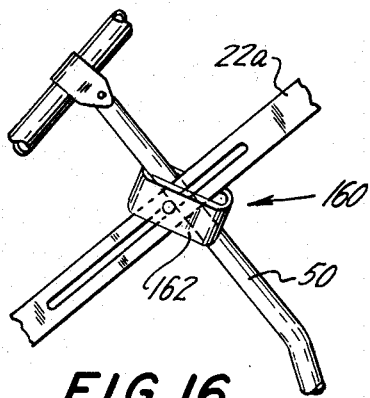
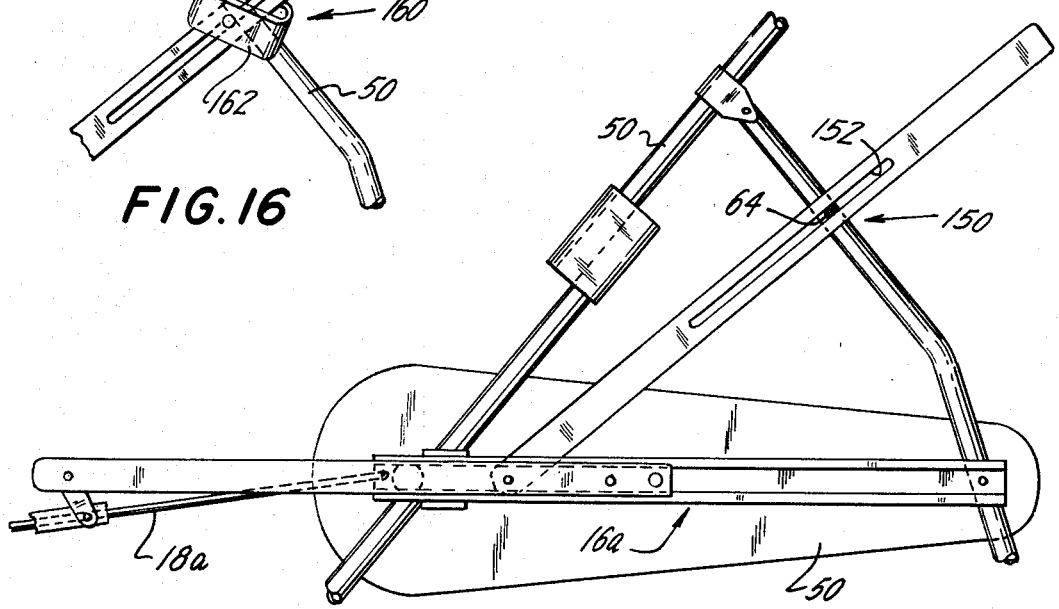
FIG. 15

FOLDING BABY CARRIERS

FIELD OF THE INVENTION

The present invention provides an improved child carrier which is adapted to be supported by conventional support frames, and which easily converts from a seat to a bed, that is, from an upright position to a reclining position and positions intermediate thereto and requires a minimum of storage capacity.

BACKGROUND OF THE INVENTION

With today's accent on economy and efficiency, it is important to young parents that their stroller function not only as a child sitting device but also, if possible, as a carriage as well. To this end, it has been suggested to employ stroller frames as supported structures for child carriers which have the capability to function as a chair or seat as in a conventional stroller, as well as to recline into a carriage or bed. Thus, examples of convertible type child carriers are disclosed in U.S. Pat. No. 240,991 to Fuller, U.S. Pat. No. 523,903 to McPhee et al, U.S. Pat. No. 770,852 to Grover, U.S. Pat. No. 1,414,897 to Reilly, U.S. Pat. No. 2,493,646 to Schmidt, U.S. Pat. No. 4,084,849 to Ishida et al., as well as in copending application Ser. No. 927,107 filed July 24, 1978, now U.S. Pat. No. 4,265,481.

BRIEF DESCRIPTION OF THE INVENTION

In accordance with the present invention, there is provided a carrier for infants or young children capable of being adjustably deployed in a reclining position as a bed, or upright position as a seat or chair, or semi-reclining or semi-upright positions therebetween.

The carrier of the invention includes a head-back portion, a seat portion pivotally connected to the head-back portion and adapted to be moved between upright and reclining positions relative to the seat portion, the seat portion being adapted to slide forward in a direction away from the head-back portion or rearward in a direction toward the head-back portion in a substantially horizontal attitude, upon movement of the head-back portion, a leg rest portion pivotally connected to the seat portion and adapted to be moved between reclining and upright positions relative to the seat portion, and locking means for temporarily locking the position of the head-back portion (or leg rest portion or seat portion) in a first position, so that the head-back portion and leg rest portion are maintained at a desired angle to the seat portion. Upon release of the locking means, the head-back portion may be pivoted to a second position with respect to the seat portion and thereby impart corresponding substantially horizontal movement to the seat portion which in turn imparts pivotal movement to the leg rest portion with respect to the seat portion in a direction opposite to the movement of the head-back portion.

The carrier of the invention also includes carrier support means (which may be part of a support frame system) such as a stroller frame as disclosed in copending application Ser. No. 927,280, filed July 24, 1978, the disclosure of which is incorporated herein by reference. The carrier support means supports the seat portion when in a forward (reclining) position, rearward (upright) position, or a position therebetween. Furthermore, the seat portion includes sliding means such as a track, rail or grooved member or a pair of such members for slidably engaging the seat support means.

The locking means preferably comprises adjustable positioning means in communication with the head-back portion and containing at least two position settings, and more preferably three or more position settings for reclining, remaining upright or semi-reclining or semi-upright positions therebetween, into which positions the head-back portion may be locked, and engaging means in communication with the head-back portion for engaging the head-back portion in at least one of said positions on the adjustable positioning means. In this manner, the position of the head-back portion (and thus the position of the leg rest portion) may be temporarily fixed with respect to the seat portion, and the position of the seat portion will be temporarily fixed as well.

The adjustable positioning means will preferably take the form of a slotted member connected to the carrier support means, which slotted member includes recesses portions adapted to receive the above engaging means for each position setting.

The carrier may be formed of a rigid material such as hard plastic, metal, wood, or laminate, so that it is capable of supporting its own weight. Alternatively, the carrier may be formed of a soft material such as canvas, fabric, soft plastic, cushioning material, and, in such case, may further include a carrier support frame disposed about and removably connected to the sides and/or ends of the leg rest portion, seat portion and the head-back portion.

The carrier as described above may be attached to a frame, such as a stroller, carriage and/or high chair frame. In such case, the carrier may be welded, bolted or otherwise attached to such frame. Alternatively, the carrier may include frame attaching means comprising grooves, rods or rails adapted to engage corresponding members of a frame.

In another embodiment of the present invention, the head-back portion and leg rest portion of the carrier will further include side and optionally end bracing or supports disposed about the sides and ends of the head-back portion and leg rest portion, the side and end bracing or supports being pivotally connected to each other, and the seat portion will include seat side and end bracing or supports disposed about the sides and ends of the seat portion, the seat side and end bracing or supports being pivotally connected to each other. In such case, the head-back portion, leg rest portion, and seat portion may be formed of flexible material the flexible or soft material of the head-back portion, seat portion, and leg rest portion being suspended from their respective supports.

The leg rest portion may be removably connected to the seat portion.

BRIEF DESCRIPTION OF THE ACCOMPANYING FIGURES

FIG. 8 is a full top view of the baby carrier illustrated in FIG. 7;

FIG. 9 is a side view of the baby carrier shown in FIGS. 7 and 8 wherein the baby carrier is in a reclined position;

FIG. 10 is a section view of the seat portion of the baby carrier shown in FIGS. 7 to 9 taken along lines 10—10 of FIG. 8;

FIG. 11 is a sectional view of a part of the seat portion taken along lines 11—11 of FIG. 10;

FIG. 12 is a bottom view of one side of the baby carrier illustrated in FIGS. 7 to 9 but broken away;

FIG. 13 is an enlarged view of the leg rest portion of the baby carrier shown in FIGS. 7 to 9 and 12;

FIG. 14 is a fragmentary side view of another baby carrier in accordance with the present invention illustrating alternate locking means which may be also employed in conjunction with the baby carriers of the invention such as shown in FIGS. 1 to 6 and FIGS. 7 to 13; FIG. 14 shows the carrier in the upright position;

FIG. 15 is a side view of the carrier of FIG. 14 in the reclining position; and

FIG. 16 is a fragmentary view of yet still another embodiment of locking means which may be employed in conjunction with the baby carriers of the invention such as shown in FIGS. 1 to 6, FIGS. 7 to 13 and FIGS. 14 and 15.

DETAILED DESCRIPTION OF THE FIGURES

Figure 1:
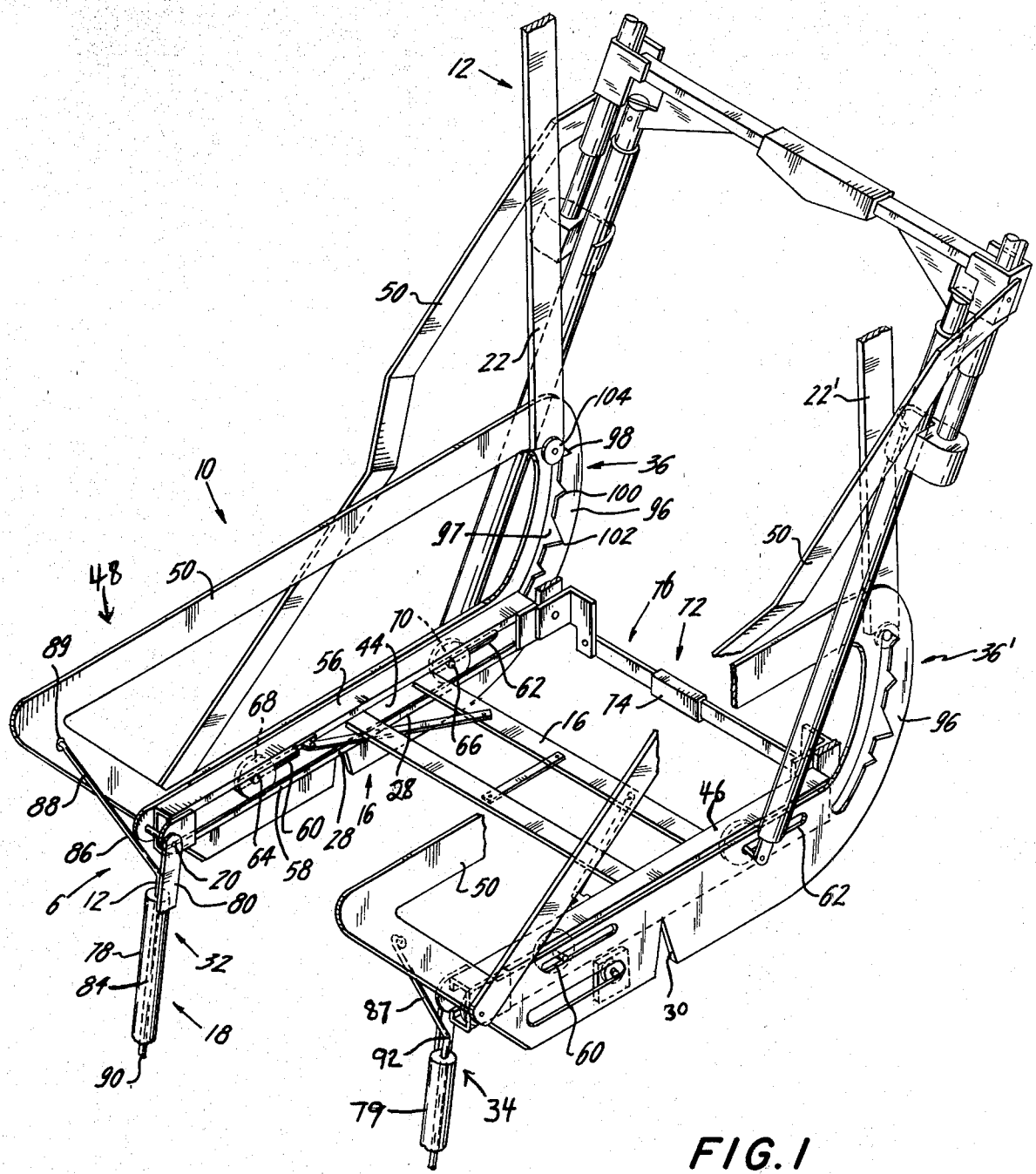
FIG. 1 is a perspective view of a portion of an adjustable three-way baby carrier in accordance with the present invention including a head-back portion, seat portion, leg rest portion, locking means and associated components, wherein the baby carrier is in an upright, setting position.

Referring now to FIGS. 1 to 6, there is shown a preferred three-way carrier in accordance with the present invention identified generally by the numeral 10.

The carrier 10 is referred to as a three-way carrier because it includes three sections which may be easily manipulated to achieve various operating positions from an upright sitting position through a reclining lying position, and semi-upright and semi-reclining positions therebetween through the use of a unique seat slide mechanism and leg-rest mechanism. The carrier 10 may be employed with an appropriate frame to form part of a stroller combination, carriage combination, baby walker, and the like or by itself as a car seat which may be converted into a car bed, high chair, a youth chair, an infant seat and the like. Furthermore, the carrier 10 is easily collapsed into a flat configuration (where the three sections are folded flat against each other) to take up a minimum of space during storage. Thus, the carrier 10 of the invention is designed for versatility. In order to achieve the desired versatility, the carrier 10 will preferably have the structure as described below.

In order to best illustrate and understand the inventive carrier, the carrier as shown depicts support structure for supporting a baby holder made of fabric, soft plastic, cushioning material as well as rigid material such as wood, metal or plastic.

The carrier 10 includes head-back portion 12 pivotally connected via pivot 14 to seat portion 16, and leg-rest portion 18 which is pivotally connected via pivot 20 to seat portion 16, as shown.

In the embodiment as shown in FIGS. 1 to 6, as best seen in FIGS. 1 to 5, the carrier 10 includes peripheral support structure in the form of head-back portion side support bracing 22 (and 22') and optional end bracing (not shown for drawing clarity); the seat portion includes side support bracing 28 (and 30) also referred to as seat slide members 28 (and 30), pivotally connected to the head-back portion side bracing 22 (and 22'), respectively; and the leg rest portion includes side support bracing 32 (and 34) pivotally connected to respective side support bracings 28 (and 30) of the seat portion, and optionally leg rest portion end bracing pivotally connected to the leg portion side support bracing 32 (and 34) (not shown for drawing clarity).

It will be appreciated that the above-described support braces may not be entirely necessary where the head-back portion, seat portion, and/or leg rest portion of the carrier are made of rigid self-supporting materials, such as metal, wood, hard plastic, laminates, and the like.

The carrier 10 may include various types of hinging mechanisms as disclosed in application Ser. No. 927,107 filed July 24, 1978, incorporated herein by reference, connecting the three sections with respect to one another as well as to facilitate folding or collapsing of the carrier to a flat disposition for storage purposes.

In FIGS. 1 to 6, as described above, each of the head-back portion 12, seat portion 16, and leg rest portion 18 include a pair of side support bracing members as described above, the head-back portion may include a pair of locking means 36(36'), one for each of the head-back side support bracing members 22(22'), the leg rest portion includes one or two leg rest control members 86(87), for each leg rest portion side support bracing members 32(34) and the seat portion 16 includes a pair of slotted members 44(46) (the purpose of which will become apparent later). However, for the sake of simplicity and illustration, inasmuch as each member of each pair of structural components mentioned above is essentially the same as its other member of the pair, the carrier of the invention may be described at times, in terms of a single member of each pair of structural components mentioned.

As shown in accompanying Figures, the carrier 10 is attached to carrier support means 48 by means of the seat portion side bracing or slide members 28(30); the carrier support means 48 will take the form of a portion of carrier support frame or stroller frame 50.

In a preferred embodiment, as shown, the seat portion includes seat support members which may take the form of the side bracing or slide members 28(30), which are positioned to slide back and forth within the frame 50 as desired for reasons which will become apparent hereinafter. To facilitate control of the seat slide members 28(30), each of such members includes a pair of guide walls or rails 56,58 and at least one elongated slot 60, and preferably two elongated slots 60 and 62, as shown, which run along the length of the seat slide members 28(30), and are disposed between the guide walls 56,58 as shown. Pin or shaft members 64,66 are fixedly attached to and extend from the carrier support means 48 through each of the slots 60,62 (as shown) and function as travel guide means for the seat portion 12 and the slide members 28(30) therefor. To facilitate desired sliding of the seat portion 12, a rolling or wheeled member 68(70) is rotatably attached to each end of the pin members 64,66 extending through the slot 60,62 and are designed to rotate between the pair of guide walls 56,58 of the seat slide members 28(30).

The head-back portion 12 may be provided with control means 72 which may take the form of bracing 76 which is pivotally connected to each of the head-back portion side bracing members 22,24 as shown. The bracing 76 may include hinge 74 to facilitate collapsing of the carrier 10.

Thus, it will now be apparent that sliding motion of the seat portion 12 may be initiated by applying a pushing or pulling force on the bracing 74 thereby imparting a corresponding force to seat slide members 28(30) which causes the sliding motion of the seat slide members 28(30) along the length of the slots 60,62 and guided by the pin members 64,66 extending through such slots. As the seat slide members 28(30) move, the guide walls 56,58 impart a rotating motion to the wheeled members 68,70 which in turn imparts a smooth sliding motion to the seat slide members 28(30).

Figure 3:
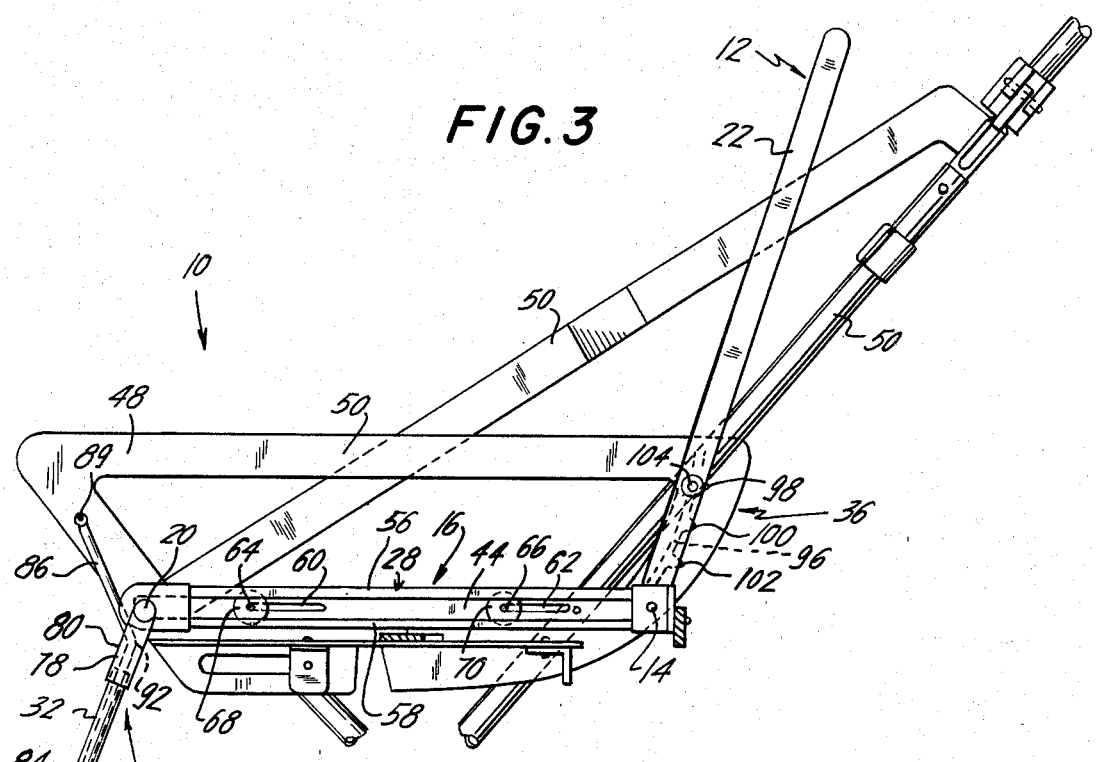
FIG. 3 is a side view of the baby carrier shown in FIGS. 1 and 2 wherein the baby carrier is in an upright position.
Figure 2:
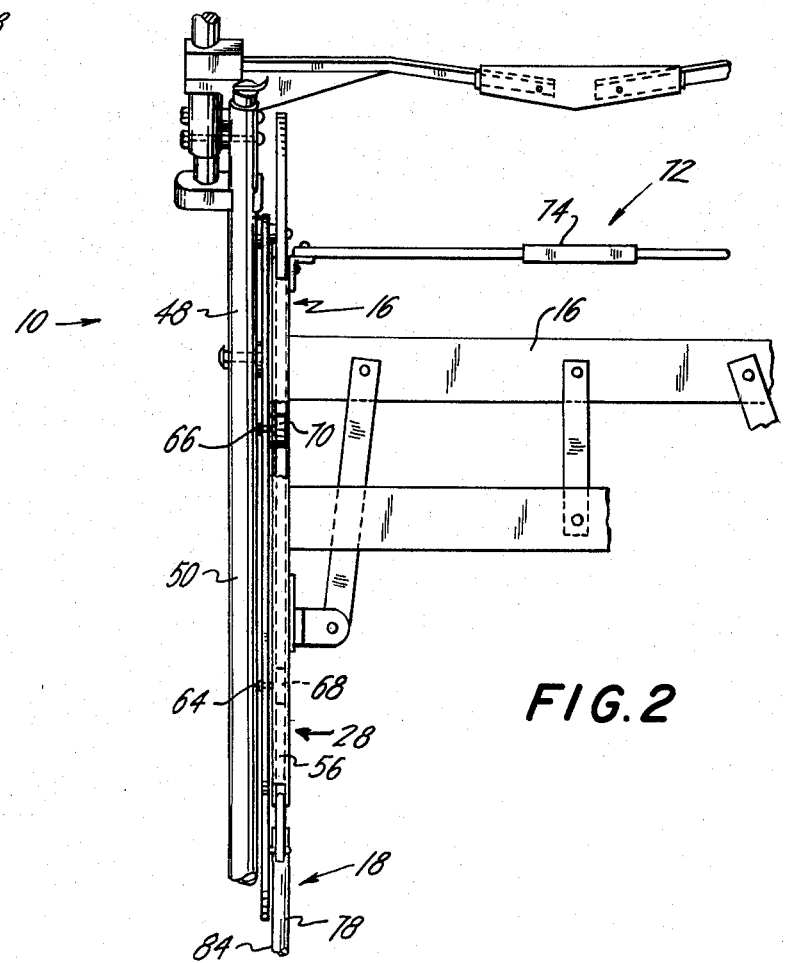
FIG. 2 is a partial top view of the baby carrier illustrated in FIG. 1.

As indicated above, in the preferred embodiment shown in FIGS. 1 to 6, the leg rest portion 18 is pivotally attached via pivots 20 to the ends of seat slide members 28(30) of the seat portion 16. As best shown in FIGS. 1, 3, 4 and 6, the leg rest portion 18 is comprised of leg rest support members 78(79), one end 80 of which is pivotally attached via pivot 20 to the end of the seat slide members 28(30); the free ends of leg rest support members 78(79) include tubular portions 84 as shown. Leg rest control members 86(87) are pivotally attached at one end 88 via pivot 89 to the carrier support means 48 and the other end 90 of which is adapted to extend into the tubular portion 84 of the leg rest support members 78(79). As shown, the leg rest control members 86(87) are fashioned with a bent or angled portion 92 which begin short of the entrance of the leg rest control members 86(87) into the tubular portions 84 of the leg rest support members 78(79), when the leg rest support members 78(79) are disposed in substantially alignment with the seat slide member 28(30) as shown in FIG. 3.

Operation of the leg rest portion 18 will now be apparent. Sliding motion of the seat portion 16 and thus the seat slide members 28(30) thereof will in turn cause corresponding movement in the leg rest support members 78(79) and the leg rest control members 86(87). When sliding motion of the seat portion 16 ceases, the leg-rest support members 78(79) and leg rest portion 18 are disposed in specific disposition vis-a-vis the seat portion 16; the leg rest control members 86(87) maintain and support the leg rest support members 78(79) at such disposition or angle to the seat portion 16.

The carrier 10 of the invention includes locking means generally indicated by the numerals 36(38) which are employed to temporarily lock or fix the position of the head-back portion 12 or the leg rest portion 18 or even the seat portion 16, and thereby temporarily stabilize the carrier 10 and maintain the angle of each of the head-back portion 12 and the leg rest portion 18 to the seat portion 16.

Figure 4:
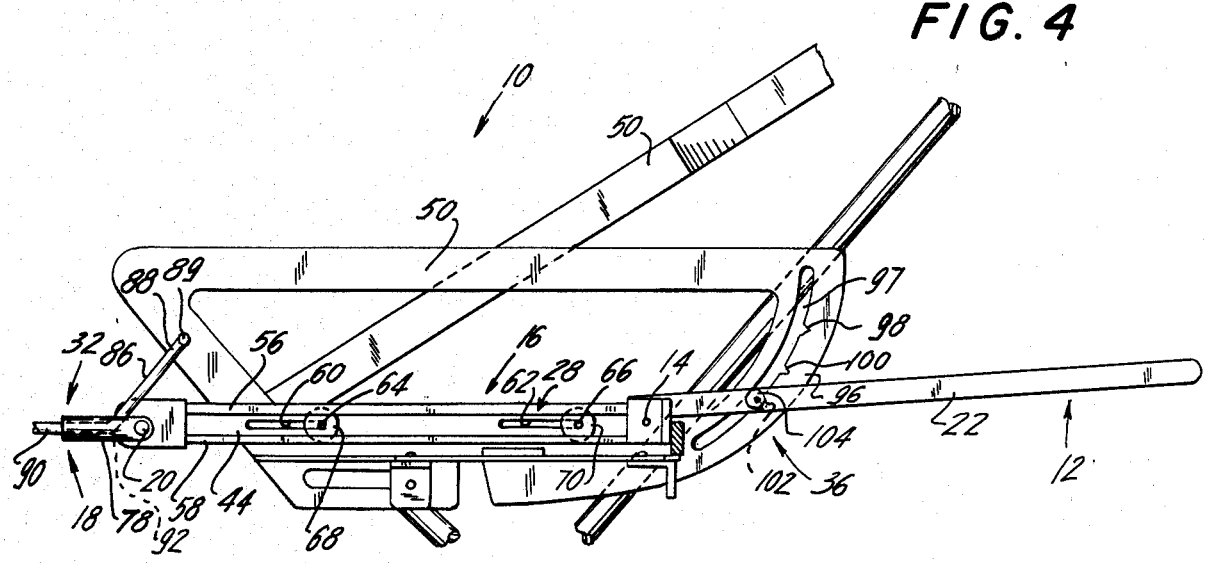
FIG. 4 is a side view of the baby carrier shown in FIGS. 1 and 3 in a reclining position.
Figure 5:
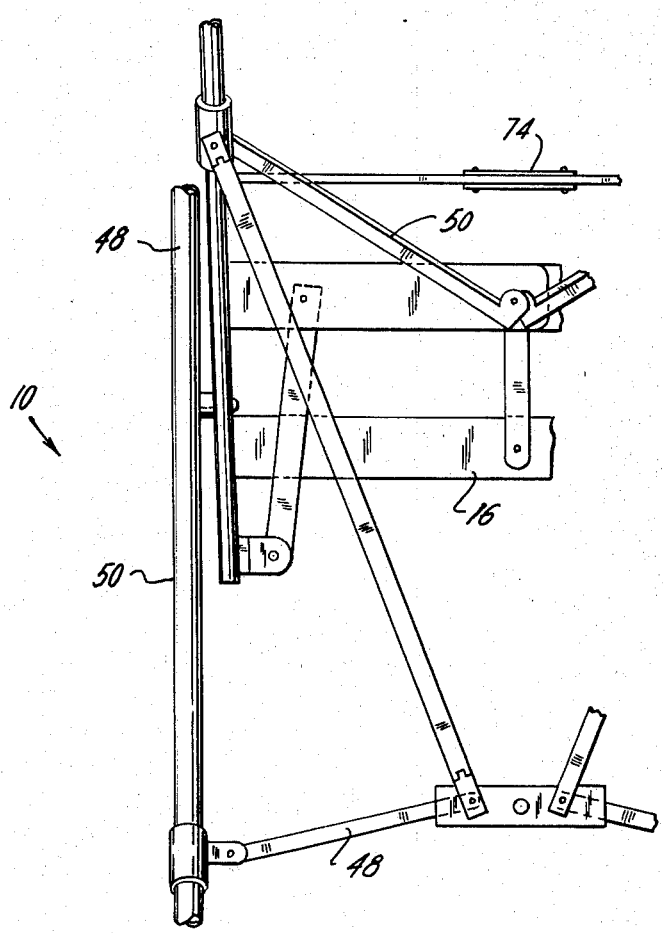
FIG. 5 is a bottom view of one side of the baby carrier illustrated in FIGS. 1 to 4, but broken away.

As shown in FIGS. 1, 3 and 4, the locking means 36(38) comprise a slotted portion 96 of the carrier support means 48, which slotted portion 96 is preferably fashioned in the form of a semi-circle or arc 97 which includes a series of two or more recessed areas or openings 98,100,102 which function as position settings for the head-back portion 12. Thus, as shown, the semi-circular slot 97 includes recessed portion 98 which corresponds to the upright position for the head-back portion, recessed portion 100 which corresponds to a semi-reclining position, and recessed area 102 which corresponds to a reclining position.

The head-back side bracing members 22(24) will include engaging means in the form of a nub or protrusion 104 which is adapted to engage the desired setting on the semi-circular slot 97 and remain lodged in such position until the head-back side bracing members 22(24) are moved to the next desired position.

In operation, the carrier shown in FIGS. 1 to 6 may be deployed in various positions and converted from one position to another as follows.

Where it is desired to convert the carrier 10 from an upright chair or seat as shown in FIG. 1 to a reclining bed as shown in FIG. 4, all one need do is to dislodge the locking means 36(38) of the head-back side bracing 22(24) from its recessed upright position 98 by manually lowering the head-back bracing 22(24) or pushing on the control bracing 76 by hand or by foot. The head-back side bracing 22(24) is then simply lowered so that its engaging means 104 move down the semi-circular slot 97 toward recessed reclining position 102. As the head-back side bracing 22(24) is lowered, the seat portion 16 and seat slide members 28(30) are pushed toward the leg rest portion 18 causing the seat portion 16 to slide forward. As the seat portion 16 slides forward, it raises the leg rest support member 78(79) to a position approaching alignment with the seat portion 16. Once the desired reclining attitude for the carrier 10 is attained, the head-back side bracing 22(24) via its engaging means 104 are locked into recessed position 102 of the semi-circular slot 97 so that the reclining angle of the head-back portion 12 relative to the seat portion 16 is stabilized; the leg rest control members 86(87) stabilize the position of the leg rest portion 18 with respect to the seat portion 16.

The carrier of the invention is now in position to function as a bed or recliner.

Where it is desired to convert the bed or recliner to a chair or seat, the engaging means 104 of the head-back locking means 36(36') will be dislodged from recessed position 102 and the head-back side bracing 22(22') will be raised (by pulling up on bracing 76 or on the head-back portion side bracing 22(22') so that the engaging means 104 may be engaged with recessed upright position 98 and thereby causing the seat portion 16 and its support members to be pulled and slide back toward the head-back portion 12. The leg rest support members 78(79) will thereby be lowered and maintained by the leg rest control members 86(87) at a desired angle to the seat portion 16 once the head-back portion 12 is locked into its seat or chair position.

It will also be appreciated that the distance that the seat portion and its slide members 28(30) will slide along the carrier support means 48 will be restricted to the length of the slots 60(62) in the seat slide members 28(30).

The locking means employed in the carrier 10 shown in FIGS. 1 to 6 may also comprise means for preventing rotation of the wheeled members 68,70, such as openings or recesses in the guide walls 56,58 in which such wheeled members may be lodged. Such an embodiment is illustrated in the carrier shown in FIGS. 7 to 13.

As seen in FIGS. 7 to 13, another preferred carrier of the invention is shown which is similar to carrier 10 shown in FIGS. 1 to 6 and is identified generally by the numeral 10a.

The carrier 10a includes head-back portion 12a pivotally connected via pivot 14a to seat portion 16a, and leg rest portion 18a which is pivotally connected via pivot 20a to seat portion 16a, as shown. The carrier 10a is supported in stroller frame 50, only a portion of which is shown for drawing clarity; the frame 50 includes carrier support means 48a comprised of a pair of tracks, rails or grooves or preferably channeled members 57,57a as shown in FIGS. 8 to 11 which include upper track 56a and lower track 58a, upper track 56a including a series of openings 110 the purpose of which will become apparent hereinafter.

Carrier 10a includes seat slide members 28a,30a for supporting seat portion 16a, the seat slide members 28a,30a being designed to ride within the channel or passageway of carrier support means 48a as shown. To facilitate movement and sliding action of the seat slide members 28a,30a, the seat slide members 28a,30a are fashioned with one or more wheeled members 112,114 rotatably mounted on the seat slide members 28a,30a and adapted to ride along and rotate between the upper and lower tracks (or guide walls) 56a and 58a of the channel members 57,57a comprising the carrier support means 48a. It will now be apparent that the sliding or rolling motion of the seat slide members 28a,30a may be stopped by engaging the wheeled members 112,114 in the openings 110 in the upper tracks 56a of the channel members 57,57a comprising the carrier support means 48a. In fact, the weight of the child, seated in the carrier 10a, on the seat slide members 28,30a forces the back wheels or rollers 114 into the openings or slots 110 locking the seat slide members 28a,30a into a desired stable or immobile position.

The head-back portion 12a will include collapsible control member or bracing 74a (similar to that described in FIGS. 1 to 6 (bracing 74)) and a downward force of an arm or leg on the control member 74a releases the wheels or rollers 114 from openings or slots 110. The carrier 10a may then be moved from a reclining position (shown in FIG. 9) to an upright position (shown in FIG. 7) or vice versa or positions therebetween by simply effectuating sliding the seat slide members 28a,30a to or fro. However, such downward force on the control member 74a while preferred is not absolutely necessary inasmuch as application of sufficient forward or backward pressure on the head-back portion side bracing 22a,24a will cause the wheels 114 to roll out of the slots 110.

Leg rest portion 18a which is pivotally connected at one end of the seat portion 16a (that is the seat slide members 28a,30a thereof) as shown and is comprised of leg rest control members 86a,87a which are pivotally connected via pivots 89a to the seat slide members 28a,30a and include a tubular portion 84a. Leg rest support members 78a,79a are pivotally connected via pivots 82a to the carrier support member 48a as shown and extend into the tubular portion 84a of the leg rest control members 86a,87a. Each of the leg rest control members are bent or angled (at 92a) just prior to the point where the tubular portion 84a begins and where the leg rest support members 78a,79a enter each of the tubular portions 84a. As seen in FIG. 9, the tubular portion 84a is in alignment with each of the leg rest support members 78a,79a when members 78a,79a are in the reclining position.

The leg rest portion 18a shown in FIGS. 7 to 13 and described above functions in a manner similar to that described for the leg rest portion 18 shown in FIGS. 1 to 6, that is the leg rest control members 86a,87a temporarily stabilize the position of the leg rest portion 18a when the seat portion 16a is in a temporarily stable position.

The carrier 10a of FIGS. 7 to 13 may include locking means in addition to or in lieu of the openings 110 in the channel members 57,57a. For example, the carrier may include locking means as described above with respect to carrier 10 of FIGS. 1 to 6. In addition, the carrier 10 of FIGS. 1 to 7 as well as the carrier 10a of FIGS. 7 to 13 may include any of the head-back locking means or adjustable positioning means disclosed in copending application Ser. No. 927,107 filed July 24, 1978, and incorporated herein by reference.

Figure 7:
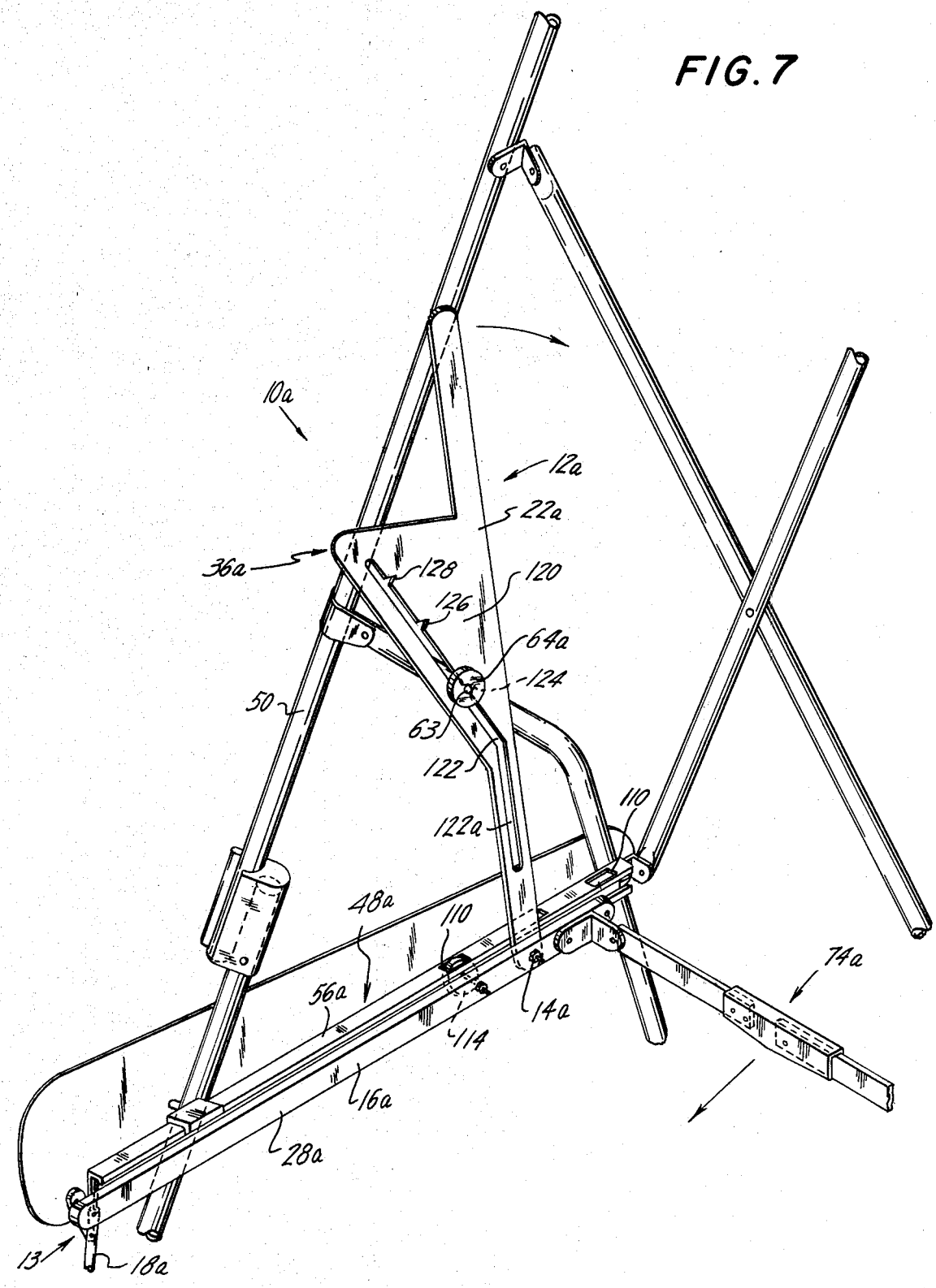
FIG. 7 is a perspective view of a portion of another embodiment of an adjustable three-way baby carrier in accordance with the present invention, including a head-back portion, seat portion, leg rest portion, locking means and associated components wherein the baby carrier is in an upright, sitting position.

Another type locking means suitable for use herein comprises lock members 36a(38a), which preferably takes the form of the head-back portion side bracing members 22a(24a) of the head-back portion 12a as best shown in FIGS. 7 and 9. The head-back portion bracing members 22a,24a include a triangular portion 120 which includes a slot 122, and preferably at least two, and more preferably more than two, position settings in the form of recessed areas 124 (upright), 126 and 128 (reclining). Engaging means 63 in the form of pin members or protrusions 64a(66a) are fixedly mounted to the carrier support means 48a and are designed to engage the recessed areas 124, 126 or 128 of the lock members 36a(38a) to fix the head-back portion 12a at a desired position.

The carrier 10a operates in a manner similar to that described with respect to the carrier 10 shown in FIGS. 1 to 6. Where it is desired to fix the position of the seat portion 16a, the weight of a child on the seat portion will facilitate lodging of the wheeled members 114 in the openings 110 of the channel members 57,57a.

As shown best in FIG. 7, the slot 122 of the lock members 36a,38a (forming the head-back portion side bracing members) extend downwardly to slotted portion 122a. The slotted portion 122a receives the pin members 64a(66a) when the carrier 10a retained in stroller frame 50 is collapsed as part of the complete stroller.

The angle of the slot 122 vis-a-vis the downward slot 122a determines the limits of the horizontal to vertical incline of the head-back portion 12a and may be varied to suit any frame.

Furthermore, the amount of forward and backward sliding movement of the seat slide members 28a,30a of carrier 10a and 28,30 of carrier 10 may be lengthened or decreased to accommodate any frame.

Figure 6:
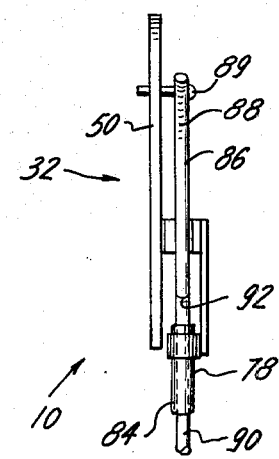
FIG. 6 is an enlarged view of the leg rest portion of the baby carrier shown in FIGS. 1 to 5.

It will also be appreciated that the carriers 10,10a described above may be employed as a self-supporting carrier with or without a frame, with or without foldable legs, for example, as a car seat, car bed, infant seat and the like in a manner as described with respect to the carriers shown in FIGS. 6, 7 and 12 of application Ser. No. 927,107.

Referring now to FIGS. 14 and 15, there is shown an alternate carrier locking means 150 which may be employed in conjunction with any of the carriers of the present invention. Locking means 150 takes the form of the head-back portion side bracing members 22a,24a of carrier 10a of FIGS. 7 to 13 (or 22,24 of carrier 10 of FIGS. 1 to 6) and includes a longitudinal slot 152 running a substantial length of such members as shown. The slot 152 is adapted to be engaged by pin members 64a,66a of carrier 10a (or pin members 66,68 of carrier 10 as shown); the pin members being fixed to the frame 50. The slot 152 may include recessed areas similar to the recessed areas 98,100,102 of the lock members 36,38 of carrier 10 or recessed areas 124,126,128 of the lock members 36a,38a of carrier 10a to engage the pin members and fix the position of the head-back portion. The carrier of the invention fashioned with locking means 150 will function in a manner similar to carriers 10 and 10a to go from the upright position of FIG. 14 to the reclining position of FIG. 15 wherein the seat portion has moved to a forward position.

Referring now to FIG. 16, there is shown yet another embodiment of carrier locking means identified by the numeral 160. Locking means 160 comprises a collar 162 attached to the frame 5 and is adapted to surround the head-back portion side bracing members 22a,24a (or 22,24). In this embodiment, such head-back portion side bracing members need not include a slot.

In operation, to reposition the carrier in a frame, the head-back portion side bracing 22a,24a (or 22,24) may be pivoted upwardly or downwardly (by application of appropriate force as described hereinbefore) thereby causing the seat slide members 28a,30a or 28,30 to slide to a desired position while imparting corresponding movement to the leg rest portion 18a or 18 opposite to that of head-back portion side bracing members 22a,24a or 22,24. When a desired position is reached and the force on the head-back portion 12a or 12 is lifted, collar 162 will atomatically retain the head-back portion slide bracing members in such position thereby immobilizing the seat portion and leg rest portion.

The carriers 10 and 10a may include a head-back portion-tilt mechanism 50 as shown in FIGS. 1, 5 and 17 to 19 of application Ser. No. 927,107, filed July 24, 1978 whereby the head-back portion 12,12a may be adjusted at a desired angle to the seat portion 16,16a. The tilt mechanism 50 as shown in FIGS. 1, 5 and 17 to 19 of Ser. No. 927,107 includes hinge means 14 disposed between the seat portion 16 and head-back portion 12, and an adjustable positioning means or semi-circular member 52, including a plurality of openings 54 placed around the semi-circular member, each opening adapted to receive a knub, pin or plunger 56.

An upper end portion of the semi-circular member 52 is connected to the head-back portion 12 or if desired to the seat portion 16. An arm rest member or other similar member 60 is connected to the seat portion 16 and includes at least one opening 62 which is adapted to be aligned with one of the openings 54 of the semi-circular member 52.

Thus, by simply withdrawing plunger or pin 56 from the opening 54 of the semi-circular member 52, the head-back portion 12 is free to move toward or away from the seat portion 16. The position of the head-back portion 12 may be fixed at a desired tilt or angle to the seat portion 16 by simply releasing the plunger 56 so that it extends through the opening 62 of the arm rest member 60 and one of the openings 54 of the semi-circular member 52.

Furthermore, in each of the embodiments of the tilt mechanism described herein or in Ser. No. 927,107, the semicircular member or arc member 52 may be replaced by a series of openings located in side panels or supports for a seat disposed on the seat portion 16 as will be apparent to those skilled in the art.

The carriers 10,10a of the invention described above may be connected to any appropriate frame (a portion of which is shown in FIGS. 1 and 8 and identified as 50,50a or 48, 48a) such as a stroller frame.

If desired, the leg rest portions 18,18a of carriers 10,10a may include a foot rest 198 which may be fixed or pivotally attached to the lower portion of the leg rest portion 18,18a as shown best in FIG. 1 of Ser. No. 927,107. The foot rest 198 will normally extend the width of the leg portion.

In addition, the carriers 10,10a may include various side supports or barriers 130 which may be fixed or pivotally attached to either side of the head-back portion 12,12a and the carriers 10,10a may also include side support panels 132 pivotally connected to either side of the seat portion 16,16a and/or even the leg rest portion 18,18a as shown in FIGS. 20 and 21 of Ser. No. 927,107. Each of the side support members may be pivoted or folded into storage or non-use position.

The carriers 10,10a of the invention may also include a universal base or conventional seat mounting which may permit the carrier to be mounted on a stroller frame, carriage frame as well as on bases or legs so that it may be used as a high chair, car seat and the like.

What is claimed is:

1. A carrier for infants capable of being adjustably deployed in a plurality of positions, with or without a frame, comprising, in combination, a head-back portion, a substantially horizontally disposed seat portion pivotally connected to the head-back portion, and said head-back portion being adapted to be moved between upright and reclining positions relative to said seat portion, said seat portion being applied to slide forward in a direction away from said head-back portion or rearward in a direction toward said head-back portion, in a substantially horizontal attitude, upon movement of said head-back portion, a leg rest portion pivotally connected to said seat portion and responsive to movement of said seat portion and head-back portion and adapted to be moved between reclining and upright positions relative to and upon corresponding movement of said seat portion, and locking means for temporarily locking the position of said head-back portion in a first fixed position at a desired angle to said substantially horizontally disposed seat portion, whereby upon release of said locking means, said head-back portion may be pivoted to a second fixed position with respect to said substantially horizontally disposed seat portion and thereby impart corresponding substantially horizontal movement of said seat portion which in turn imparts pivotal movement of said leg rest portion with respect to said seat portion in a direction opposite to the movement of said head-back portion, said seat portion being substantially horizontally disposed regardless of the position of said head-back and leg rest portions, and further including carrier support means for supporting said seat portion when in a forward position, rearward position or a position therebetween, and said seat portion includes sliding means for slidably engaging said carrier support means and said sliding means of said seat portion comprises at least one slidably engageable member for slidably engaging a corresponding member of said carrier support means, and said carrier support means comprises a seat support frame.

2. The carrier as defined in claim 1 wherein said sliding means of said seat portion includes one or more horizontally disposed slots and said carrier support means includes at least one fixedly mounted pin member which extends into said at least one horizontally disposed slot of said sliding means of said seat portion to guide movement of said seat portion along the length of said at least one horizontally disposed slot and thereby limit movement of said seat portion to a distance equal to and no more than the length of said at least one horizontally disposed slot.

3. The carrier as defined in claim 2 further including a rotatable member rotatably connected to an end of said pin member of said seat support frame and extending into and through said at least one horizontally disposed slot, said rotatable member engaging said at least one slidably engageable member of said seat portion sliding means to facilitate sliding of said seat portion with respect to said seat support frame.

4. The carrier as defined in claim 3 wherein said sliding means of said seat portion comprise a pair of spaced apart guide walls and said rotatable member of said seat support frame is rotatably mounted between said guide walls to facilitate sliding of said seat portion with respect to said seat support frame along the length of said at least one horizontally disposed slot.

5. The carrier as defined in claim 4 wherein said seat portion includes at least two longitudinally spaced apart horizontally disposed slots and said seat support frame includes at least two fixedly mounted pin members, one pin member extending through each of said horizontally disposed slots to guide sliding movement of said seat portion along the length of said horizontally disposed slots, said seat support frame further including one rotatable member rotatably connected at an end of each of said pin members extending through said horizontally disposed slots, said rotatable members being positioned to rotate between said guide walls of said seat portion and facilitate sliding movement of said seat portion with respect to said seat support frame.

6. The carrier as defined in claim 4 wherein said at least one slidably engageable member comprising said sliding means of said seat portion includes means for engaging said rotatable member at a desired position along said at least one horizontally disposed slot to temporarily stop sliding movement of said seat portion with respect to said seat support frame.

7. The carrier as defined in claim 4 wherein said rotatable member comprises a wheel, a bearing surface or a roller which rotates about said fixedly mounted pin member as its center.

8. The carrier as defined in claim 1 wherein said seat portion comprises a pair of spaced apart substantially horizontally disposed elongated side bracing members, said head-back portion comprises a pair of spaced apart elongated side bracing members each one of which is pivotally attached to a rearward end of said seat portion horizontally disposed elongated side bracing member, and said leg rest portion comprises a pair of spaced apart elongated side bracing members one end of each of which is pivotally attached to a forward end of said seat portion horizontally disposed side bracing member, each one of said bracing members comprising said head-back, seat, and leg rest portions working in substantially unison with its complimentary member.

9. The carrier as defined in claim 1 wherein said carrier support means includes at least one slidably engageable member which is in sliding engagement with said sliding means of said seat portion.

10. The carrier as defined in claim 9 wherein said carrier support means includes a pair of spaced apart guide walls and said sliding means of said seat portion is in slidable engagement with said guide walls.

11. The carrier as defined in claim 10 wherein said sliding means of said seat portion comprises at least one rotatable member rotatably but fixedly mounted to said seat portion positioned between and adapted to rotate within said pair of spaced apart guide walls to facilitate sliding movement of said seat portion with respect to said carrier support means.

12. The carrier as defined in claim 9 wherein said at least one slidably engageable member of said carrier support means includes at least one means for engaging said sliding means of said seat portion to temporarily prevent movement of said seat portion with respect to said carrier support means.

13. The carrier as defined in claim 11 wherein at least one of said pair of spaced apart guide walls includes means for engaging said rotatable member to temporarily limit or stop movement of said seat portion with respect to said carrier support means.

14. The carrier as defined in claim 11 wherein said sliding means of said seat portion comprises at least two spaced apart rotatable members mounted on fixed axes to said seat portion, and said guide walls of said carrier support means include at least two openings therein or protuberances to engage at least one of said rotatable members when it is desired to temporarily prevent movement of said seat portion with respect to said carrier support means.

15. The carrier defined in claim 1 wherein at least an end portion of said leg rest portion comprises a tubular member, and said leg rest portion further includes a rod-like leg rest control member one end of which is pivotally attached to said carrier support means and the other end of which extends into said tubular member, said leg rest control member aiding in raising said leg rest portion when said seat portion is made to slide away from the head back portion or aiding in lowering said leg rest portion when said seat portion is made to slide toward the head back portion, said control member maintaining said leg rest portion at a temporarily fixed position when said seat portion is in a stationary position.

16. The carrier as defined in claim 15 wherein said leg rest control member comprises a bent rod an upper end of which is pivotally connected to said carrier support means at a position above said seat portion, and the bent portion of said bent rod extending to but stopping short of the tubular member when said leg rest portion is disposed in substantial alignment with said seat portion, while the remaining unbent portion of said bent rod extends into said tubular member.

17. The carrier as defined in claim 1 wherein said leg rest portion comprises leg rest control means one end of which is pivotally connected to said seat portion and which includes a tubular member, and a substantially straight elongated member one end of which is pivotally attached to said carrier support means and the other end of which extends into said tubular member, said leg rest control means aiding in raising said leg rest side bracing member when said seat portion is made to slide away from said head-back portion or lowering said leg rest side bracing member when said seat portion is made to slide toward the head-back portion, and said leg rest control means maintaining said leg rest side bracing member at a temporarily stationary position when said seat portion is in a stationary position.

18. The carrier as defined in claim 17 wherein said leg rest control means includes a bent angled portion and a straight tubular portion one end of said bent angled portion being pivotally connected to said seat portion and the other end of the bent angled portion extends only to the entrance of said leg rest side bracing member into said tubular member when said leg rest side bracing member is disposed in substantial alignment with said seat portion while the leg rest side bracing member extends into the straight tubular portion of said leg rest control means.

19. The carrier as defined in claim 1 wherein said locking means comprises adjustable positioning means in communication with said head-back portion, and optionally containing at least two position settings at which said head-back portion may be temporarily locked, and engaging means in communication with said head-back portion, for engaging said head-back portion in at least one of said positions on said adjustable positioning means, thereby temporarily fixing the position of said head-back position with respect to said seat portion.

20. The carrier as defined in claim 19 wherein said adjustable positioning means comprises a slotted member affixed to said carrier support means, said slotted member optionally including said at least two positions in the form of openings or recessed areas, and said engaging means comprises pin means connected to said head-back portion and adapted to engage at least one of said openings or recessed areas thereby temporarily fixing the position of said head-back portion with respect to said seat portion.

21. The carrier as defined in claim 20 wherein said slotted member is in the form of a semi-circular-shaped track or grooved member.

22. The carrier as defined in claim 21 wherein said slotted member comprises side bracing for said head-back portion.

23. The carrier as defined in claim 8 wherein said lock means comprises collar means connected to said carrier support means and adapted to encircle said head-back portion side bracing members.

24. The carrier means as defined in claim 19 wherein said adjustable positioning means comprises a triangular member connected to said head-back portion, said triangular member including a slotted portion which optionally includes said at least two positions in the form of openings or recessed areas, and said engaging means comprises pin means connected to said carrier support means and adapted to engage at least one of said openings or recessed areas thereby temporarily fixing the position of said head-back portion with respect to said seat position.

25. The carrier as defined in claim 1 further including tilt control means connected to said head-back portion for moving said head-back portion and thereby causing said seat portion to move toward or away from said head-back portion and fixing the head-back portion and leg-rest portion at a desired angle to said seat portion.

26. The carrier as defined in claim 1 wherein said carrier support means comprises a portion of a frame for supporting said carrier.

27. The carrier as defined in claim 1 wherein said head-back portion further includes back side bar supports disposed about the sides of said head-back portion, said seat portion includes seat side bar supports disposed about the sides of said seat portion, said seat side bar supports being pivotally connected to said side bar supports of said head-back portion and said leg rest portion includes side bar supports disposed about the sides of said leg rest portion and pivotally connected to said side bar supports of said seat portion.

* * * * *